US005457395A

United States Patent [19]
Koski et al.

[11] Patent Number: 5,457,395
[45] Date of Patent: Oct. 10, 1995

[54] SYSTEM AND APPARATUS FOR MEASURING GAPS BETWEEN NON-PARALLEL SURFACES

[75] Inventors: John W. Koski, Bear Lake; David B. Kwiecinski, Dearborn, both of Mich.

[73] Assignee: Ford Motor Company, Dearborn, Mich.

[21] Appl. No.: 276,369

[22] Filed: Jul. 18, 1994

[51] Int. Cl.⁶ ........................................ G01R 27/00
[52] U.S. Cl. .................... 324/644; 324/637; 250/239; 250/559.29
[58] Field of Search ........................ 324/637, 642, 324/644; 356/355, 356, 357, 358, 375; 250/206, 239, 561, 571; 33/284, 600, 608, 783, 784

[56] References Cited

U.S. PATENT DOCUMENTS

| | | | |
|---|---|---|---|
| 3,849,724 | 11/1974 | Ghibu et al. | 324/34 D |
| 4,005,936 | 2/1977 | Redman et al. | 356/5 |
| 4,070,116 | 1/1978 | Frosch et al. | 356/156 |
| 4,606,638 | 8/1986 | Sommargren | 356/351 |
| 4,666,303 | 5/1987 | Pryor | 356/375 |
| 4,744,661 | 5/1988 | Ulbers et al. | 356/358 |
| 4,796,994 | 1/1989 | Bager | 356/358 |
| 4,849,644 | 7/1989 | Mira et al. | 250/561 |
| 4,886,365 | 12/1989 | Ulbers | 356/351 |
| 4,900,151 | 2/1990 | Ulbers | 356/358 |
| 4,924,172 | 5/1990 | Holmgren | 324/664 |
| 5,067,250 | 11/1991 | Auweiler et al. | 33/783 |
| 5,068,795 | 11/1991 | Kamimura et al. | 356/375 X |
| 5,085,516 | 2/1992 | Bertrand et al. | 356/394 |
| 5,089,698 | 2/1992 | Grego | 250/231.13 |
| 5,140,533 | 8/1992 | Celette | 364/559 |
| 5,206,703 | 4/1993 | Holmes et al. | 356/372 |
| 5,239,183 | 8/1993 | Kouno et al. | 250/561 |

*Primary Examiner*—Kenneth A. Wieder
*Assistant Examiner*—Diep Do
*Attorney, Agent, or Firm*—Joseph W. Malleck; Roger L. May

[57] ABSTRACT

A system for measuring the gap between two surfaces is disclosed. The sensing apparatus comprises an actuator, an active sensor and a display. The actuator actuates operation of the sensing apparatus. The active sensor includes a transmitter for transmitting a wave signal beam reflectable off one of the surfaces and a receiver for receiving the reflected wave signal beam by the sensing apparatus. A signal processor is in electrical communication with the actuator, the transmitter and the receiver, for processing the reflected wave signal beam to determine the gap between the two surfaces. The display is in electrical communication with the signal processor for displaying the amount of gap between the two surfaces.

17 Claims, 2 Drawing Sheets

SYSTEM AND APPARATUS FOR MEASURING GAPS BETWEEN NON-PARALLEL SURFACES

TECHNICAL FIELD

This invention relates to a system for measuring gaps between non-parallel surfaces. In particular, this invention relates to a system for measuring the gap spacing between two vehicle body panels.

BACKGROUND ART

In the manufacture of cars, it is highly desirable for body panels, such as doors, for example, to have a uniform gap falling within a nominal size when the panels are fitted together. This condition is often difficult to achieve in practice and requires rigid statistical controls on the panel production and assembly in order to insure that quality can be maintained.

Several known methods have been used to measure seal gaps. One known method involves measuring gaps using clay and a scale. Portions of clay are placed on one of the surfaces. The second surface is brought into alignment with the first surface causing the clay to contract into the gap between the two surfaces. The clay is then removed, and the width is measured using a scale or caliper to determine the gap between the two surfaces. This method, as with any manual measuring system, is tedious, time consuming and susceptible to technician error or inconsistency of technique.

A second known method of measuring seal gaps involves obtaining digital measurements between parallel surfaces using a hand-held measurement instrument. This method utilizes a passive sensor system. A magnetic sensor generates a magnetic field, and the distance between two magnetic surfaces is determined based upon the disruption of the magnetic field caused by the proximity of one of the metal surfaces. The signal generated by the disruption in the magnetic field is transmitted to a converter by way of a cable. This cable is susceptible to damage. In addition, this measurement system is susceptible to errors caused by the orientation of the earth's magnetic field. Also, this system is not practicable for vehicle applications involving plastic body panels.

A device for measuring gap and flush is disclosed in U.S. Pat. No. 5,067,250, issued to Auweiler et al. The device includes a housing having a base with an application face which, in use, is placed on the surface of one of the parts. A probe projects from the housing and is movable against a return force in the direction of the housing. Electromechanical transducers are disposed within the housing for detecting the displacement of the probe. This device must be manually guided along the gap to be measured which may be tedious if done manually or may be expensive if done automatically. This device also includes moving parts which are less reliable than stationary parts. The moving parts may shift or wear after continuous use, thereby resulting in inaccurate gap measurements.

In summary, known techniques do not include a convenient and reliable system for measuring gaps between two surfaces. Still further, a need has developed to provide a system for measuring the gap between two non-parallel surfaces.

DISCLOSURE OF THE INVENTION

The present invention contemplates a system for measuring the gap between two non-parallel surfaces.

It is another object of the present invention to provide a system for measuring the gap between two body panels of an automotive vehicle.

It is yet another object of the present invention to provide a system for automatically measuring the gap between two body panels of an automotive vehicle upon bringing the second surface in contact with the sensing apparatus positioned on the first surface.

In carrying out the above objects and other objects of the present invention, a sensing apparatus is provided for sensing the distance between two non-parallel surfaces.

The sensing apparatus includes a housing having a base and an oppositely positioned face. The base is placed upon the first surface. The face is placed toward the second surface. The face of the housing is at a predetermined angle with respect to the base in order to provide a parallel surface between the face and the second surface.

The sensing apparatus further includes an actuator for initiating and controlling operation of the sensing apparatus. The actuator initiates the generation of a wave signal beam after it has been actuated.

The sensing apparatus includes a transmitter for transmitting a wave signal beam reflectable off a second surface and a receiver for receiving the reflected wave signal beam. Alternatively, a transceiver can be used in place of both the transmitter and the receiver.

A signal processor is electrically coupled to the transmitter and the receiver for processing the reflected wave signal beam to determine the gap between the first surface and the second surface.

The sensing apparatus also includes a display in electrical communication with the signal processor for displaying the amount of gap between the first surface and the second surface.

Further in accordance with the invention, the sensing apparatus includes a timer in electrical communication with the actuator and the transmitter for allowing automatic actuation of the sensing apparatus after a predetermined amount of time.

The sensing apparatus also includes a retractable plunger extending from the base of the housing to aid in securing the sensing apparatus to one of the surfaces.

The above objects, features and advantages of the present invention, as well as others, are readily apparent from the following detailed description of the best mode for carrying out the invention when taken in connection with the accompanying drawings.

BRIEF DESCRIPTION OF THE DRAWINGS

The present invention will be apparent from the detailed description taken in conjunction with the accompanying drawings in which.

BEST MODE FOR CARRYING OUT THE INVENTION

Figure 1:
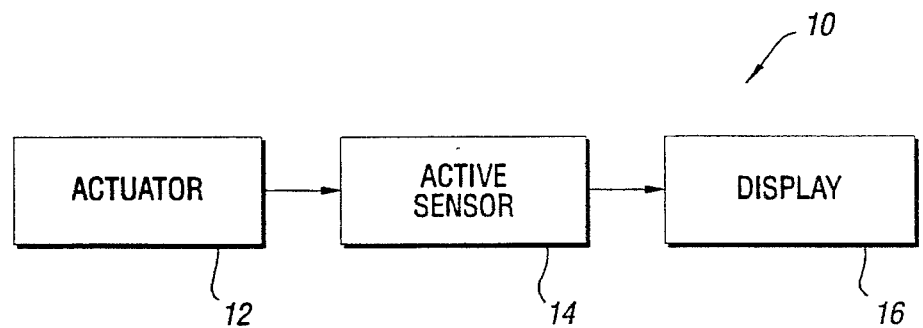
FIG. 1 is a block diagram of the preferred embodiment of the present invention.

Referring now to FIG. 1, there is shown a gap sensing apparatus 10 made in accordance with the teachings of the preferred embodiment of this invention. As shown, sensing apparatus 10 includes an actuator 12, an active sensor 14, a display 16, and a battery (not shown).

The sensing apparatus is placed between two surfaces 42, 44 defining a gap to be measured. The sensing apparatus 10 is initiated via the actuator 12 which generates an actuating signal. Upon receiving the actuating signal, the active sensor 14 transmits a wave beam signal towards a second surface 42. The wave beam signal may be in the form of sound waves such as sonic or ultrasonic waves. Alternatively, the wave beam signal may be in the form of electromagnetic signals, such as laser, incoherent light, or radio frequency (RF).

The wave beam signal is then reflected off the second surface 42 and a beam normal to the second surface will be received by the active sensor 14 from which it was transmitted to be used in determining the gap between the two surfaces 42, 44. The measured gap is then displayed on the display 16.

Figure 2:
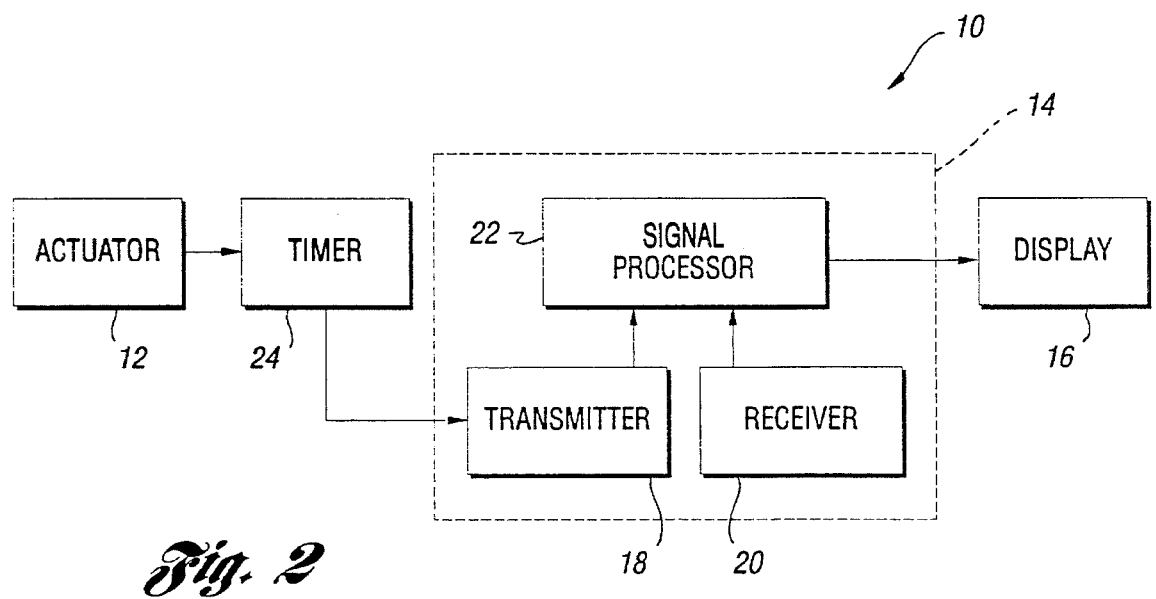
FIG. 2 is a block diagram of gap sensing apparatus made in accordance with the teachings of the preferred embodiment of the present invention.

In the preferred embodiment, the active sensor 14 includes a transmitter 18, a receiver 20, and a signal processor 22, as shown in FIG. 2. Alternatively, the transmitter 18 and the receiver 20 may be replaced by a transceiver capable of both transmitting a signal and receiving the reflected signal. The transmitter 18 transmits the wave beam signal to the second surface defining the gap to be measured. The wave beam signal is then reflected off the second surface and received by the receiver 20 which is located on the first surface.

The reflected wave beam signal received by the receiver 20 is transferred to the signal processor 22. Based upon the received reflected wave beam signal and the known distance between the transmitter 18 and the receiver 20 from the bottom surface of the base of the active sensor 14, the signal processor 22 computes the distance or gap between the two surfaces by measuring some indicia of the reflected beam, e.g., phase, amplitude, or frequency of the reflected beam. These methods are known by those having skill in the ordinary art.

For example, a specific embodiment utilizing a light source may include modulating the light source prior to transmission to generate a wave signal beam, receiving and demodulating the reflected wave signal beam, and comparing the time delay or the phase difference between the two signals to determine the distance between the light source and the reflective surface. Devices are generally of the type described in U.S. Pat. No. 4,744,661, issued to Ulbers et al. and U.S. Pat. No. 4,796,994, issued to Bager.

In the alternative, a specific embodiment utilizing an audio source may include providing an audio signal having a predetermined frequency and phase to generate a wave signal beam, amplifying the signal prior to transmission, receiving the reflected wave signal beam, and comparing the time, frequency or phase difference between the two signals to determine the distance between the light source and the opposite surface.

In the preferred embodiment, the actuator 12 activates the sensing apparatus 10 after a predetermined amount of time via a timer 24. The timer 24 allows the sensing apparatus 10 to automatically initiate operation of the sensing apparatus 10 upon two surfaces coming into alignment with each other after a predetermined amount of time. Alternatively, the actuator 12 may activate the sensing apparatus 10 instantaneously.

In the preferred embodiment, the actuator 12 is an integral part of the sensing apparatus 10. It may be a button that is depressed when the second surface is brought into alignment with the first surface when the sensing apparatus 10 is placed between the two surfaces. Alternatively, the actuator 12 may be remotely located from the sensing apparatus 10, separated by a cable (not shown).

After computing the gap between the two surfaces, the gap measurement is displayed on the display 16. Preferably, the sensing apparatus 10 continuously displays the measured gap until the actuator 12 is reactivated. This aspect of the invention allows the user time to review the measurement after it has been recorded.

Figure 3:
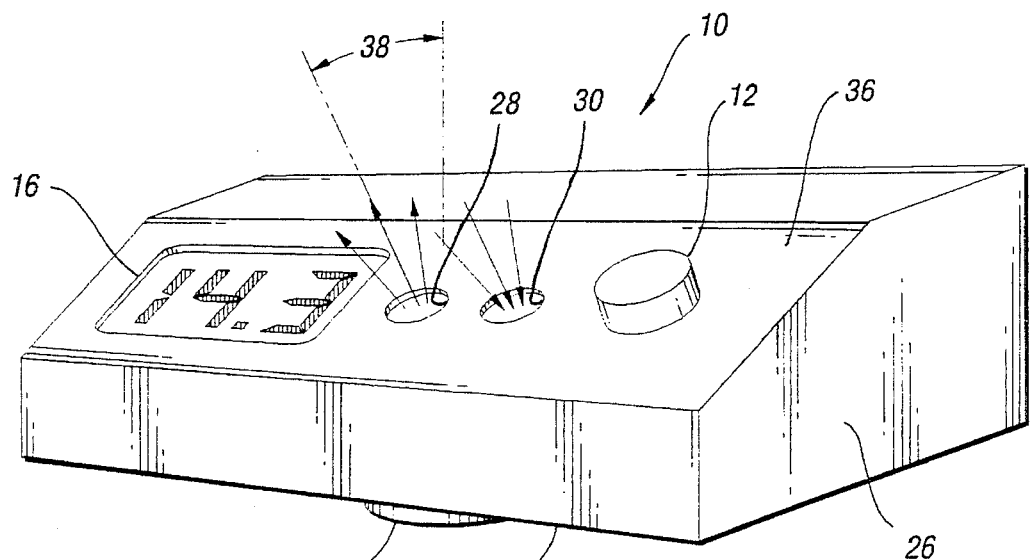
FIG. 3 is a perspective view of a gap sensing apparatus made in accordance with the teachings of the preferred embodiment of the present invention.

Turning now to FIG. 3, the sensing apparatus 10 is enclosed in a housing 26 having dimensions suitable for placing the sensing apparatus 10 within the gap defined by two surfaces. Therefore, the housing 26 is designed based on specific vehicle applications. Alternatively, the housing 26 may be designed to accommodate several vehicle applications.

In the preferred embodiment, the actuator 12 is a retractable, resiliently biased button extending far enough from the housing 26 to ensure contact between the second surface and the actuator 12 when the sensing apparatus 10 is placed between the two surfaces and the second surface is brought into alignment with the first surface. The display 16 provides a digital readout to the operator of the sensor indicating the gap between the two surfaces being measured. The display 16 may be in the form of either an LCD display or a VF display. In the preferred embodiment, the display 16 continues to display the measured gap until the actuator 12 is actuated again by either the operator depressing the button or by bringing a surface into contact with the button during a subsequent gap measurement. Alternatively, the actuator 12 may be a switch located remote from the sensing apparatus 10 via a cable (not shown). The sensing apparatus 10 would then be activated by an operator manually depressing the actuator 12 after the sensing apparatus is in place to measure a gap.

The transmitter 18 of the active sensor 14 transmits the wave beam signal through a transmitter opening 28. Consequently, the receiver 20 receives the wave beam signal through a receiver opening 30. The signal processor 22 would then process the reflected wave signal beam received by the receiver 20 to determine the gap between the two body panels.

In accordance with a further aspect of the invention, a retractable spring biased plunger 32 extending from a base 34 is provided to help locate the sensing apparatus 10. The base 34 is the surface that is placed onto one of the surfaces defining the gap to be measured.

Figure 5:
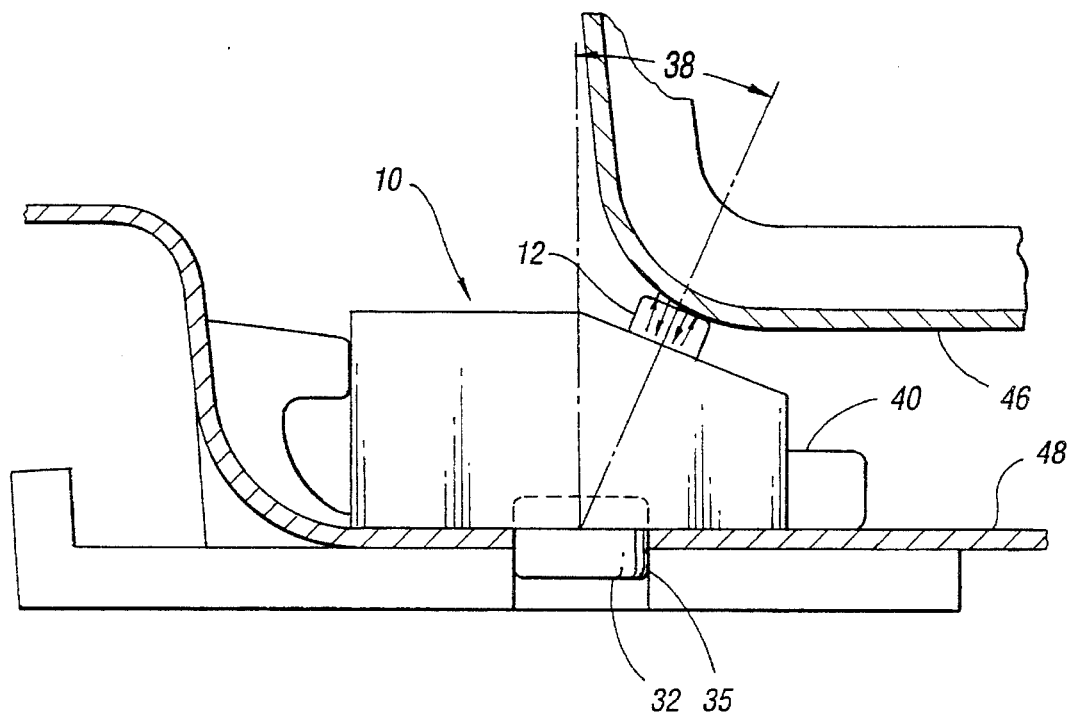
FIG. 5 is a fragmentary side elevational view illustrating a vehicle application of the present invention.

Weatherstrip seals are normally positioned in a recess of one of the two body panels in automotive vehicles. In order to locate these weatherstrip seals, retainer channels fastened to the weatherstrip seals are snapped into several push pin holes 35, as shown in FIG. 5, located throughout the body panel. The sensing apparatus 10 can then be positioned by allowing the retractable plunger 32 to extend into a push pin hole 35.

The sensing apparatus 10 can still be used where push pin holes 35 are not present since the retractable plunger 32 recedes into the base 34 of the housing 26 under its own weight. Preferably, the base 34 is magnetic in order to aid the sensing apparatus 10 to be positioned in a recess of one of the body panels.

The sensing apparatus 10 shown in FIG. 3 is designed to fit within a particular make and model automobile. The vehicle is designed with predetermined allowable gap spacing. The body panels of the vehicle are designed to align at a predetermined angle. To accommodate the predetermined gap spacing and the angle of the body panels, the dimensions of the sensing apparatus 10 are determined to ensure the sensing apparatus 10 fits within the recess between the two body panels; for example, the height of the sensing apparatus 10 is 9 mm; the length, 25 mm; and the width, 16.5 mm. These dimensions vary as the vehicle specifications vary.

With continued reference to FIG. 3, the face 36 of the sensing apparatus 10 is shown to be at an angle 38 from the centerline of the housing 26, such that the face 36 is not parallel to the base 34 of the housing 26. The face 36 of the sensing apparatus 10 is angled to accommodate non-parallel surfaces so that the sensing apparatus 10 is, in essence, measuring the gap between two parallel surfaces. To accommodate the aforesaid particular vehicle, the angle 38 of the face 36 is 25 degrees. Alternatively, if the sensing apparatus 10 is to be used to measure gap spacing between parallel surfaces only, the angle 38 is zero, thus the face 36 is parallel to the base 34 of the housing 26.

Figure 4:
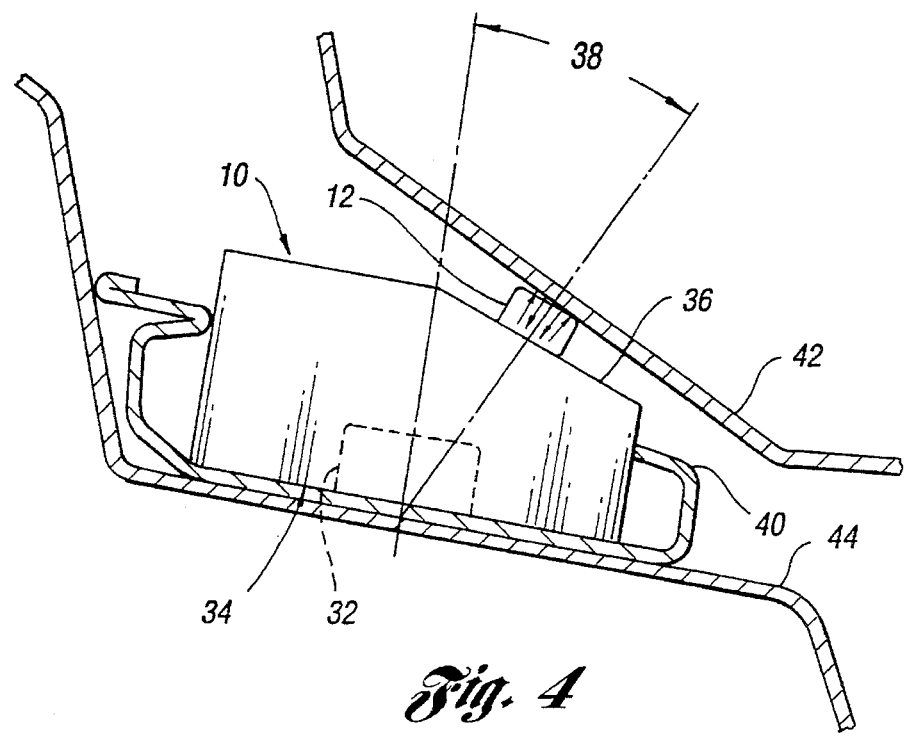
FIG. 4 is a fragmentary side elevational view illustrating a vehicle application of the present invention.

FIGS. 4 and 5 illustrate respective vehicle applications of the present invention. In FIG. 4, the actuator 12 is shown located on the housing 26. When the second surface is brought into alignment with the first surface, the actuator 12 is retracted, thereby initiating operation of the sensing apparatus 10. In addition, the transmitter 18 is in line with the receiver 20 in the same plane. Alternatively, a single transceiver may be used in place of both the transmitter 18 and the receiver 20.

With continued reference to FIG. 4, the sensing apparatus 10 is placed within a weatherstrip retainer channel 40 between two body panels 42, 44 defining the roof rail of the aforesaid particular vehicle. Since there is not a push pin hole 35 located at this position, the retractable plunger 32 is receded into the base 34. A magnetic base 34 is preferred to ensure secure placement of the sensing apparatus 10. Since the two surfaces are not parallel, the angle 38 of the face 36 emulates parallel surfaces.

The transmitter 18 transmits a wave signal beam through the transmitter opening 28. The wave signal beam is reflected off body panel 42 and received by the receiver 20 via the receiver opening 30. The signal processor 22 then processes the reflected wave signal beam to determine the gap between the first body panel 44 and the second body panel 42.

FIG. 5 illustrates the use of the retractable plunger 32 in measuring the gap between two panels 46, 48 defining the B-pillar of the aforesaid particular vehicle. At this location, a push pin hole 35 is present for securing the weatherstrip retainer channel 40 to the body panel 48. The retractable plunger 32, therefore, extends into the push pin hole 35 allowing secure placement of the sensing apparatus 10 when measuring the gap between the two body panels 46, 48.

While the best mode for carrying out the invention have been described in detail, those familiar with the art to which this invention relates will recognize various alternative designs and embodiments for practicing the invention as defined by the following claims.

We claim:

1. A system for measuring a gap between a first surface and a second surface, the first and second surfaces being non-parallel surfaces, the system comprising:

a housing having a base and an oppositely positioned face, the base being placed upon the first surface, the face being placed parallel from the second surface, and the face of the housing being at an angle with respect to the base to provide a parallel surface opposite the second surface, the face further having at least one opening;

an actuator for generating an actuating signal;

a transceiver disposed in the housing, responsive to the actuating signal, for transmitting a wave beam signal through the at least one opening of the face of the housing for reflection off the second surface and for receiving the reflected wave beam signal through the at least one opening of the face of the housing;

a signal processor, in electrical communication with the transceiver, for processing the transmitted wave beam signal and the reflected wave beam signal to determine the gap between the first surface and the second surface based on the received reflected wave beam signal; and a display, in electrical communication with the signal processor, for displaying the determined gap between the first surface and the second surface.

2. The system of claim 1 wherein the face includes a first and second opening and wherein the transceiver comprises:

a transmitter for transmitting a wave beam signal through the first opening for reflection off the second surface; and a receiver for receiving the reflected wave beam signal through the second opening.

3. The system of claim 1 further comprising:

a timer, in electrical communication with the actuator and the transmitter, for allowing actuation to occur after a predetermined amount of time.

4. The system of claim 1 wherein the actuator is positioned on the housing and in electrical communication with the transceiver.

5. The system of claim 4 wherein the actuator is a retractable button.

6. The system of claim 1 wherein the base of the housing is magnetic.

7. The system of claim 1 wherein the first surface includes at lest one opening and wherein the system further comprises a retractable plunger extending from the base of the housing, the plunger adapted to extend into the at least one opening in the first surface and to retract in the absence of the at least one opening so as to more accurately position the housing on the first surface.

8. The system of claim 1 wherein the signal processor is disposed in the housing.

9. The system of claim 1 wherein the display is disposed on the housing.

10. The system of claim 1 wherein the timer is disposed in the housing.

11. The system of claim 1 wherein the wave beam signal is a sound wave signal.

12. The system of claim 1 wherein the wave beam signal is an electromagnetic signal.

13. An active sensing apparatus for measuring a gap between a first surface and a second surface, the first and second surfaces being non-parallel surfaces, the sensing apparatus comprising:

a housing having a base and an oppositely positioned face, the base being placed upon the first surface, the face being placed parallel from the second surface, and the face of the housing being at an angle with respect to the base to provide a parallel surface opposite the second surface, the face further having at least one opening;

an actuator disposed on the housing for generating an actuating signal;

a transceiver disposed on the housing, responsive to the actuating signal, for transmitting a wave beam signal through the at least one opening of the face of the housing for reflection off the second surface and for receiving the reflected wave beam signal through the at least one opening of the face of the housing;

a signal processor disposed in the housing and in electrical communication with the transceiver for processing the transmitted wave beam signal and the reflected wave beam signal; and a display disposed on the housing and in electrical communication with the signal processor for displaying the determined gap between the first surface and the second surface.

14. The apparatus of claim 13 wherein the actuator is a retractable button.

15. The apparatus of claim 13 wherein the base of the housing is magnetic.

16. The apparatus of claim 13 further comprising a timer disposed in the housing and in electrical communication with the actuator and the transmitted for allowing actuation to occur after a predetermined amount of time.

17. The apparatus of claim 13 wherein the first surface includes at least one opening and wherein the apparatus further comprises a retractable plunger extending from the base of the housing, the plunger adapted to extend into the at least one opening in the first surface and to retract in the absence of the at least one opening so as to more accurately position the housing on the first surface.

* * * * *